(12) United States Patent
Urban

(10) Patent No.: US 9,816,034 B2
(45) Date of Patent: Nov. 14, 2017

(54) REACTOR AND REACTION METHOD

(71) Applicant: Process Systems Enterprise Limited, London (GB)

(72) Inventor: Zbigniew Boguslaw Urban, London (UZ)

(73) Assignee: PROCESS SYSTEMS ENTREPRISE LIMITED, London (GB)

( * ) Notice: Subject to any disclaimer, the term of this patent is extended or adjusted under 35 U.S.C. 154(b) by 0 days.

(21) Appl. No.: 14/654,807

(22) PCT Filed: Jan. 15, 2014

(86) PCT No.: PCT/GB2014/050101
§ 371 (c)(1),
(2) Date: Jun. 22, 2015

(87) PCT Pub. No.: WO2014/122421
PCT Pub. Date: Aug. 14, 2014

(65) Prior Publication Data
US 2015/0337213 A1   Nov. 26, 2015

(30) Foreign Application Priority Data
Feb. 8, 2013   (GB) .................................. 1302301.5

(51) Int. Cl.
*C10G 2/00*   (2006.01)
*B01J 8/04*   (2006.01)
(Continued)

(52) U.S. Cl.
CPC ............ *C10G 2/332* (2013.01); *B01J 8/0257* (2013.01); *B01J 8/0278* (2013.01); *B01J 8/0292* (2013.01);
(Continued)

(58) Field of Classification Search
CPC   C10G 2/332; C10G 2/341; C10G 2300/4068; B01J 8/0461; B01J 8/065;
(Continued)

(56) References Cited

U.S. PATENT DOCUMENTS 5,869,541 A    2/1999  Euzen et al.
2010/0324158 A1* 12/2010  Bowe .................. B01J 19/249
                                                518/712

FOREIGN PATENT DOCUMENTS

EP    11300190 A    4/2003
EP    1464383 A    10/2004
WO    2012146903 A  11/2012

OTHER PUBLICATIONS

Ullmann's ("Continuous Mixing of Fluids" Ullmann's Encyclopedia of Industrial Chemistry Sep. 15, 2010, p. 105-134, DOI: 10.1002/14356007.b04_561.pub2).*

(Continued)

*Primary Examiner* — Jafar Parsa
*Assistant Examiner* — Amy C Bonaparte

(57) ABSTRACT

A method of forming a hydrocarbon product, the method comprising a first step of enriching a carrier liquid with carbon monoxide and hydrogen and a subsequent step of bringing the enriched carrier liquid into contact with a catalyst in a first reaction zone of a reactor, wherein the catalyst catalyzes reaction of the carbon monoxide and hydrogen to form the hydrocarbon product.

14 Claims, 11 Drawing Sheets

(51) Int. Cl.
*B01J 8/02* (2006.01)
*B01J 8/06* (2006.01)

(52) U.S. Cl.
CPC ......... *B01J 8/0407* (2013.01); *B01J 8/0461* (2013.01); *B01J 8/0492* (2013.01); *B01J 8/065* (2013.01); *C10G 2/341* (2013.01); *B01J 2208/00132* (2013.01); *B01J 2208/00283* (2013.01); *B01J 2208/00884* (2013.01); *B01J 2208/00893* (2013.01); *B01J 2208/00938* (2013.01); *B01J 2208/02* (2013.01); *C10G 2300/4068* (2013.01); *Y10T 29/49346* (2015.01)

(58) Field of Classification Search
CPC ...... B01J 8/0407; B01J 8/0492; B01J 8/0257; B01J 8/0278; B01J 8/0292; B01J 2208/00893; B01J 2208/02; B01J 2208/00; B01J 2208/00132; B01J 2208/00283; B01J 2008/00884; B01J 2208/00938; B01J 2208/00814; B01J 2208/00884; B01J 8/0446; Y10T 29/49346; C07C 1/041
USPC ............ 518/700, 715; 29/890; 422/216, 606
See application file for complete search history.

(56) References Cited

OTHER PUBLICATIONS

Sulzer (Mellapak and MellapakPlus specification sheet, downloaded Oct. 21, 2016 from http://www.sulzer.com/nb/Products-and-Services/Separation-Technology/Structured-Packings/Mellapak-MellapakPlus-Mellapak-Plastic , p. 1-2).*
European Patent Office (EPO), International Search Report for international patent application PCT/GB2014/050101, dated Dec. 17, 2014, pp. 1-4, EPO.
Burton H. Davis, "Overview of reactors for liquid phase Fischer-Tropsch synthesis", Catalysis Today, Jan. 1, 2002, pp. 249-300, vol. 71, No. 3-4, ISSN 0929-5861.

* cited by examiner

PRIOR ART: Slurry reactor

PRIOR ART: Fixed Bed Multitubular reactor

REACTOR AND REACTION METHOD

BACKGROUND

There is increasing interest in liquid hydrocarbon sources other than naturally-occurring crude oil due to increase in cost, and depletion of, naturally occurring oil deposits.

One alternative source is liquid hydrocarbons made by the Fischer-Tropsch process, invented in the 1920s, in which carbon monoxide and hydrogen (which together form synthesis gas or "syngas") are reacted in the presence of a metal catalyst to form hydrocarbons and water. Hydrocarbons formed by the Fischer-Tropsch process may be used in a wide range of applications including use as liquid fuels (e.g. diesel and jet-fuel) and as a feedstock for forming detergents, lubricants, and olefins such as ethylene and propylene.

Industrial manufacture using the Fischer-Tropsch process has been carried out using a variety of chemical reactor equipment (see the review of Fischer-Tropsch reactors provided in Reference [1]), including slurry reactors, and fixed bed reactors. The Fischer-Tropsch process has also been demonstrated using microchannel reactors.

An exemplary slurry reactor is illustrated in FIG. 1A. Synthesis gas fed from a gas inlet is passed through a slurry containing particles of the catalyst suspended in a liquid carrier, such as heavy hydrocarbons that form liquid at the operating temperature of the reactor. The liquid mixture of hydrocarbons is known as a "wax". This reactor is a so-called three phase reactor (gas, catalyst, wax). The catalyst and wax form a slurry that is cycled through the reactor between a slurry inlet and slurry outlet. Hydrocarbon product contained in the slurry emerging from the slurry outlet is separated from the catalyst. The catalyst is fed back into the reactor and may be partially replaced with fresh or regenerated catalyst. Any unreacted gas exiting via the gas outlet may be fed back into the reactor.

The Fischer-Tropsch process is highly exothermic and so cooling coils (usually containing boiling water) are provided within the reactor. However, the temperature difference between the cooling coils and the wax needs to be kept relatively small, otherwise the significant part of the reactor volume that is in direct contact with the cooling coils would be operated at sub-optimally low temperatures due to mixing imperfections. Consequently, a large surface area is typically required for heat transfer out of the slurry.

The amount of metal tubing required for cooling a slurry reactor makes it impractical to transport the slurry reactor across land. Scaling down slurry reactors from a typical size of about 50 to 70 meters in height to a more transportable size has been found to be problematic.

Further problems associated with slurry reactors include difficulty in separation of small catalyst particles from the hydrocarbon product; high energy consumption in driving the external and the internal circulation of the slurry; and erosion of the interior of the reactor by the slurry.

An exemplary fixed bed reactor is illustrated in FIG. 1B, in which syngas is passed through long tubes (typically about 10-12 meters in length) charged with catalyst pellets. Similarly to the slurry reactor, a large surface area for the heat exchange is needed, and this is achieved by dividing the catalyst into a large number of tubes (a so-called "multi-tubular" arrangement). The heat exchange area provided by the outer surface of tubes is about 2000 m$^2$ per 1 t/h of produced syncrude. The average temperature difference between the coolant (boiling water) and the outer rim of the bed of catalyst pellets is only about 3° C.

Other problems with fixed bed reactors containing catalyst pellets include a high pressure drop over the tubes, difficulty in maintaining a desired temperature profile along the tube length, and high selectivity to methane. The latter is a result of intra-pellet diffusive limitations and is highly undesirable given the fact that the target of the Fischer-Tropsch process is the production of liquid hydrocarbons.

Microchannel reactors have also been investigated as candidates for Fischer-Tropsch reactors. Channels of a dimension in the millimeter range are charged with catalyst pellets or foils. Microchannel reactors provide a large surface area for heat transfer and can be scaled down more effectively than fixed bed or slurry reactors; however, they also suffer from problems of high pressure drop and elevated selectivity to methane.

A further problem common to all the reactor designs described above is that the internal components (e.g. cooling coils, catalyst tubes, or plates) that separate coolant from wax must be able to withstand high operating pressures (typically 25-32 barG). A large amount of steel is required for such high pressure ratings, increasing both the weight and the cost of the reactor.

A yet further problem with the above reactor designs is that the large amount of water produced as a by-product of the Fischer-Tropsch reaction dilutes the concentration of CO and $H_2$ in the gas phase, and this significantly lowers the productivity of the catalyst. However, the only means for this water to be removed from the reactor is as part of the main product stream.

Many of the problems discussed above arise from the need for providing significant amounts of cooling within the reactor, something which is intrinsic to the Fischer-Tropsch reaction given its highly exothermic nature. An alternative is to combine the syngas feed stream with an inert liquid stream (e.g. one comprising low-boiling hydrocarbons), partial vaporisation of which can absorb the heat generated by the reaction. This allows the reaction to be carried out in a trickle bed reactor without any cooling mechanism. However, maintaining good mixing between the liquid and the gas may be problematic. Reference [2] describes a design that attempts to overcome this problem by dividing the reactor bed into multiple reaction sections separated by static mixers. However, this does not address any of the other problems mentioned above (e.g. the dilution effect caused by the water generated by the reaction); in fact, the introduction of an inert liquid that gradually vaporises within the catalytic bed in order to remove the heat may result in further dilution of the concentrations of the carbon monoxide and hydrogen reactants.

SUMMARY

Preferably the invention generally provides a scalable reactor suitable for the Fischer-Tropsch process.

Preferably the invention provides a Fisher-Tropsch reactor that at micro-scale size is transportable as a whole and at medium-scale size is transportable in parts that can be assembled at the target site.

Preferably the invention provides a Fischer-Tropsch reactor and reaction process not exhibiting elevated selectivity to methane.

Preferably the invention provides a Fischer-Tropsch reactor having a low reactor weight per unit catalyst productivity.

Preferably the invention provides a Fischer-Tropsch reactor allowing for simplified heat exchange.

Preferably the invention provides a Fischer-Tropsch reactor with low pressure drop between its gas inlet and its gas outlet.

Preferably the invention provides a Fischer-Tropsch reactor that can be operated to achieve high conversion while fed with syngas containing a significant proportion of inert gases.

Preferably f the invention provides a Fischer-Tropsch reactor and reaction process in which the water by-product in the reactor is efficiently and selectively removed.

Preferably the invention provides a Fisher-Tropsch reactor in which the temperature control is not sensitive to feed fluctuations down to very low turndown ratios.

General

In a first aspect the invention provides a method of forming a hydrocarbon product, the method comprising a first step of enriching a carrier liquid with carbon monoxide and hydrogen and a subsequent step of bringing the enriched carrier liquid into contact with a catalyst in a first reaction zone of a reactor, wherein the catalyst catalyses reaction of the carbon monoxide and hydrogen to form the hydrocarbon product.

In a second aspect the invention provides a reactor for reacting carbon monoxide and hydrogen in the presence of a catalyst, the reactor comprising:
 a packing material and a reactive gas inlet located in a first gas enrichment zone of the reactor; and
 a catalyst retained by a substrate located in a first reaction zone of the reactor;
wherein the reactive gas inlet is configured to direct gas containing carbon monoxide and hydrogen through a carrier liquid passing through the packing material, and the carrier liquid enriched by reactants in the gas enrichment zone is configured to pass through the catalyst.

Optionally, the packing material of the or each gas enrichment zone is separable from a body of the reactor. Optionally, the or each substrate is separable from the body of the reactor.

In a further aspect, the invention provides a method of assembling a reactor according to the second aspect, the method comprising the step of positioning packing material in the or each gas enrichment zone and/or positioning the or each substrate in the or each reaction zone.

In a further aspect, the invention provides a method of dismantling a reactor according to the second aspect, the method comprising the step of removing the packing material of the or each gas enrichment zone and/or the or each substrate from the reactor body.

In a further aspect, the invention provides a method of replenishing catalyst in a reactor according to the second aspect, the method comprising the step of replacing used catalyst retained by the substrate with fresh catalyst.

In a further aspect, the invention provides a method of forming a hydrocarbon product, the method comprising the step of passing a carrier liquid having carbon monoxide and hydrogen absorbed therein through a catalyst supported by a first substrate, wherein the catalyst catalyses reaction of the carbon monoxide and hydrogen to form the hydrocarbon product. The method of this aspect may be carried out as described in the first aspect, and may be carried out using a reactor as described anywhere in the second aspect.

In a further aspect the invention provides a method of forming a hydrocarbon product, the method comprising a first step of enriching a part of a wax produced by the reaction with carbon monoxide and hydrogen and a subsequent step of bringing the enriched wax into contact with a catalyst in a first reaction zone of a reactor, wherein the catalyst catalyses reaction of the carbon monoxide and hydrogen to form the hydrocarbon product.

In a further aspect the invention provides a reactor for reacting carbon monoxide and hydrogen in the presence of a catalyst, the reactor comprising:
 a packing material and a reactive gas inlet located in a first gas enrichment zone of the reactor; and
 a catalyst retained by a substrate located in a first reaction zone of the reactor;
wherein the reactive gas inlet is configured to direct gas containing carbon monoxide and hydrogen through wax passing through the packing material, and wax enriched by reactants in the gas enrichment zone is configured to pass through the catalyst.

In a further aspect, the invention provides a method of forming a hydrocarbon product, the method comprising the step of passing a wax having carbon monoxide and hydrogen absorbed therein through a catalyst supported by a first substrate, wherein the catalyst catalyses reaction of the carbon monoxide and hydrogen to form the hydrocarbon product.

The method of this aspect may be carried out as described above, and may be carried out using a reactor as described above.

DESCRIPTION OF THE DRAWINGS

The invention will now be described in more detail with reference to the figures in which.

DETAILED DESCRIPTION

Figure 1A:
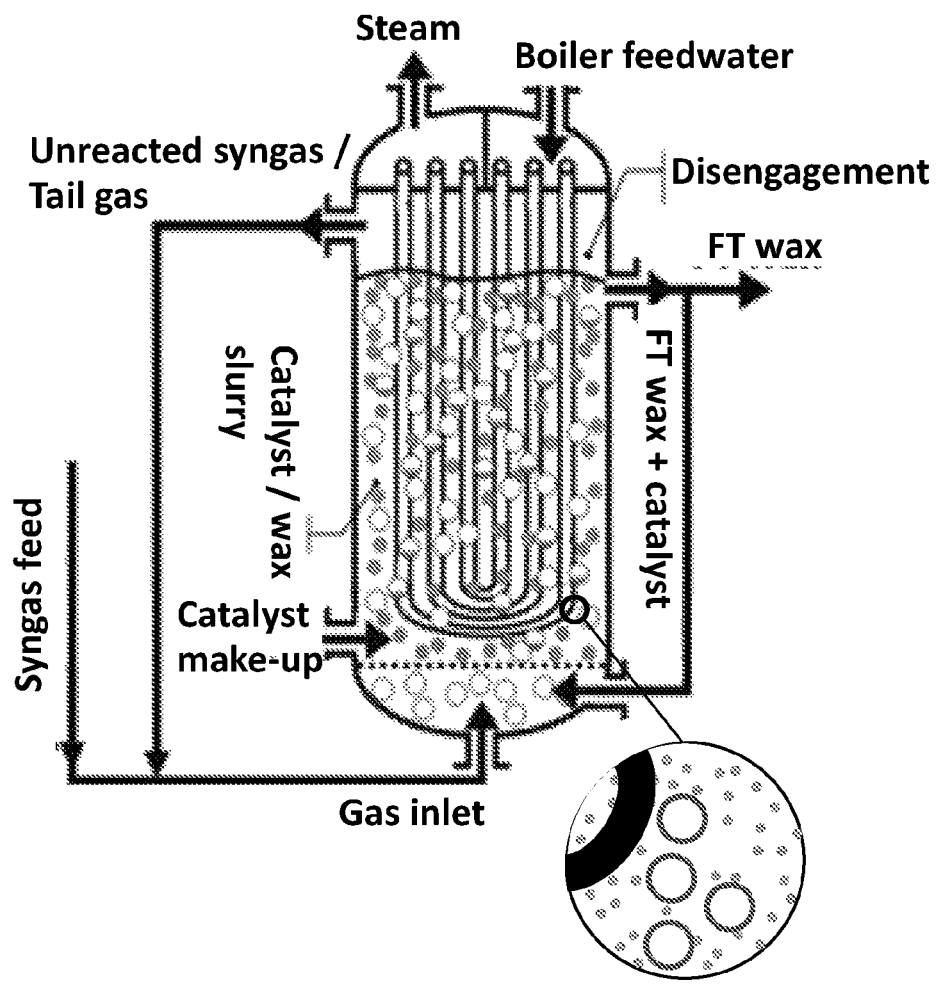
FIG. 1A illustrates a prior art Fischer-Tropsch slurry reactor.
Figure 1B:
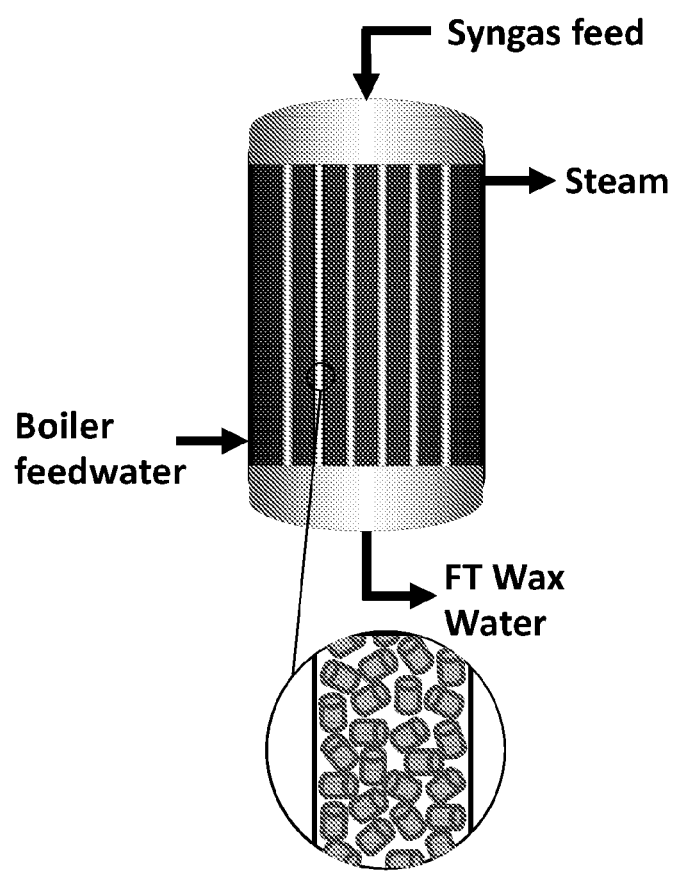
FIG. 1B illustrates a prior art Fischer-Tropsch fixed-bed reactor.

FIG. 2 illustrates a Fischer-Tropsch reactor according to an embodiment of the invention. The reactor 200 may contain a carrier material that is in liquid form at the operating temperature of the reactor and that is capable of absorbing carbon monoxide and hydrogen. Exemplary carriers include hydrocarbons, optionally heavy hydrocarbons. The carrier may be hydrocarbons formed by the Fischer- Tropsch process. Exemplary hydrocarbons, including hydrocarbons formed by the Fischer-Tropsch process, may include naphtha (about C6-C9); Kerosene (about C10-C15); Diesel (about C16-C21); and a heavy fraction (about C22-C100).

The liquid carrier is referred to hereinafter as a "wax" and the wax may include, without limitation, C5-C100 hydrocarbons, including one or more of the hydrocarbon fractions described above. In a preferred embodiment the wax may be the material produced by the reactor.

The reactor 200 may be operated at a temperature that is selected according to the catalyst being used. For example, for cobalt-based catalysts, the temperature may be within the range of about 200 to 240° C.

The reactor 200 may have a tank body 230. In one embodiment the tank body may be cylindrical. The tank body may contain a sump 234. Wax may accumulate in liquid form in the tank body; in one embodiment in the sump 234. Part of this wax is pumped from the reactor sump 234 up a wax channel 226 by a pump 204. The pump may be a propeller booster pump or any other form of low-head pump suitable for propelling the liquid. In the embodiment of FIG. 2, the wax is driven along wax channel 226 to the top of the reactor where it forms a layer of liquid wax 240 on a sieve tray 241 situated above the first gas enrichment zone 206. In other embodiments, the reactor may contain a plurality of channels 226. The pressure the pump 204 operates at is equal to the hydrostatic pressure corresponding to the height of wax channel 226, regardless of the wax flow-rate.

Syngas is introduced to the reactor from gas inlet 208 and is directed by gas-directing plates 210 towards gas channel 212. More than one gas channel 212 may be provided. In the embodiment of FIG. 2, the wax channel 226 and gas channel 212 may are concentric tubes, although in other embodiments the wax channel 226 and gas channel 212 may be separate tubes.

The syngas may consist solely of carbon monoxide and hydrogen or it may contain one or more further components. Exemplary further components may be residual gases from the feedstock used to form the syngas or may be by-products from formation of the syngas and include, without limitation, carbon dioxide, nitrogen, methane and water.

The syngas optionally contains about 30 vol. % to 50 vol. % of hydrogen. More preferably it contains about 35 vol. % to 40 vol. % of hydrogen. More preferably it contains 36 vol. % to 37 vol. % of hydrogen.

The syngas optionally contains at least 15 vol % of carbon monoxide. More preferably the syngas optionally contains about 15 vol. % to 25 vol. % of carbon monoxide. More preferably the syngas optionally contains about 17 vol. % to 20 vol. % of carbon monoxide. More preferably the syngas optionally contains about 17 vol. % to 18 vol. % of carbon monoxide.

The syngas optionally contains about 30 vol. % to 50 vol. % of hydrogen and about 15 vol % to 25 vol. % of carbon monoxide. Preferably the syngas contains about 36 vol. % to 37 vol % of hydrogen and about 17 vol % to 18 vol. % of carbon monoxide The syngas preferably contains a H2:CO molar ratio being about 2.10:1 to 2.20:1. More preferably the syngas contains a H2:CO molar ratio being about 2.15:1

Gas enrichment zone 206 contains a packing material that the gas and wax can pass through and that provides a large surface area for contact between the wax and the gas. The packing may be a randomly arranged material or a structured packing material. Structured packing may comprise corrugated metal plates or gauzes that are arranged together to form a fluid flow path. The structured packing may have an open honeycomb structure. Exemplary structured packing includes MellapackPlus® or Intalox®.

The wax may be driven through the structured packing under gravity. In operation, syngas passes between a gas inlet that may be provided by an aperture 228 in the gas channel and a gas outlet 224 such that the syngas follows a path through liquid wax in the structured packing to form a $H_2$ and CO-enriched wax. The gas stream between aperture 228 and gas outlet 224 intersects the direction of wax flow. Syngas that is not absorbed by the wax exits through gas outlet 224. Gas exiting through gas outlet 224 may contain $H_2$ or CO that has not been absorbed by the wax and/or syngas components other than $H_2$ or CO that do not absorb in the wax in appreciable quantities. Gas exiting via gas outlet 224 may be either recycled, for example if $H_2$ conversion is below 90%, or processed further in downstream operations without recycling, for example if the $H_2$ conversion is about 90%.

The gas channel 212 extends through each gas enrichment zone of the reactor, and a gas inlet aperture 228 is provided to deliver gas to each gas enrichment zone.

After leaving gas enrichment zone 206, the $H_2$ and CO-enriched wax forms a layer of liquid wax 242 situated on top of reaction zone 216. Wax from this layer passes through a reaction zone 216. Reaction zone 216 comprises a plate 218 containing a plurality of apertures 220. The plate may be formed of a metal or metal alloy, for example steel. The plate forms a substrate supporting catalyst held in porous catalyst cartridges (cf. FIG. 5A). In the embodiment of FIG. 2, porous cartridges 222 containing a catalyst are retained in some or all of the apertures 220 of plate 218. In other embodiments, the plate 218 may have a single aperture in which a porous cartridge is retained. Apertures may be of any shape. Apertures may have an area of about 35 to 40% of the total surface of the substrate. Each substrate may have about 1500 to 2500 apertures.

The cartridges 222 may be dimensioned to removably fit in the apertures 220 and/or may be removably fixed to the plate 218.

The $H_2$ and CO-enriched wax passes through the porous cartridges, where the $H_2$ and CO contact the catalyst particles contained in the cartridges, and react to form hydrocarbons and water. The wax transport mechanism across the wall of cartridge may be dominated by hydrostatic pressure-driven convection. The reaction environment is a 2-phase system of $H_2$ and CO-enriched wax and catalyst.

The dominating mass transport mechanism across the wall of the cartridge is convection driven by pressure differences. If the dimension of catalyst particles does not exceed a maximum size, optionally about 100 microns, then there may be no diffusive limitations within the catalyst material, thereby reducing selectivity to methane as compared to processes in which the mass transport of reactants and products relies entirely on molecular diffusion.

By providing separate gas enrichment zones 206 and reaction zones 216 and by ensuring that reaction zones 216 remain covered by liquid wax layers, little or no free (unabsorbed) hydrogen and carbon monoxide delivered to a gas enrichment zone 206 may reach catalyst in cartridges 222 within a reaction zone 216; substantially all hydrogen and carbon monoxide reaching the catalyst may be hydrogen and carbon monoxide absorbed in the wax such that the reaction is effectively a two-phase reaction between the enriched wax and catalyst.

Water comprises a significant part of the total product of the reaction, as illustrated by formation of pentane from hydrogen and carbon monoxide:

$$11H_2 + 5CO \rightarrow C_5H_{12} + 5H_2O$$

For every mole (72 g) of pentane formed, 5 moles (90 g) of water are also formed. Water may form about 60 weight % of the combined product from all reactions.

When a homogeneous mixture containing water by-product and wax passes through a gas enrichment zone, water by-product may be desorbed into a stream of components of the syngas and low-boiling hydrocarbon products that are not absorbed by the wax. Under the envisaged operating conditions, practically all of this water may be removed from the reactor, along with unabsorbed components of the syngas (including unreacted hydrogen and carbon monoxide, as well as other species such as nitrogen) and low-boiling hydrocarbon products, for example $C_{1-5}$ hydrocarbons, through gas outlet 224. It will be appreciated that the flow of wax in the reactor of the invention may allow for efficient separation of water from the wax, thereby avoiding the dilution of the reactants in the gas phase, and consequently in the liquid phase, that is an undesirable characteristic of other Fischer-Tropsch reactor designs.

It is preferred that most or all of the hydrogen and carbon monoxide of the syngas, optionally at least 80% or at least 90% is absorbed by the wax in the gas enrichment zones. Water and low-boiling hydrocarbon products are desorbed in the gas enrichment zones, thereby selectively removing water from both gas and liquid phases over the entire inventory of the catalyst without the need for inter-stage condensation. Low-boiling hydrocarbon products in the gas exiting via gas outlet 224 may be recovered or may be combusted.

By removal of water in the gas enrichment zones 206, and/or by providing that substantially all hydrogen and carbon monoxide coming into contact with the catalyst is absorbed in the wax rather than free gas, the water formed within cartridges may amount to no more than about 1 weight % of the wax, which may not have a significant effect on the reaction rate.

After passing through the first reaction zone 216, the wax in the embodiment of FIG. 2 passes through two further gas enrichment and reaction zones before it is pumped from the sump 234 to the top of gas enrichment zone 206. The excess of wax above the controlled level in the sump is removed from the reactor as product.

Reactors of the invention may contain only one of each of a gas enrichment zone and a reaction zone, or may contain one or more further gas enrichment and/or reaction zones, for example 2, 3, 4 or 5 gas enrichment and/or reaction zones. The reactor may contain one pair or a plurality of pairs of gas enrichment and reaction zones. Apertures 228 in gas channel 212 and gas outlets 224 may be arranged to provide a gas path 232 through each gas enrichment zone present in the reactor.

Movement of wax between gas enrichment zones and/or reaction zones may be gravity driven as wax droplet falls from cartridges onto a layer of liquid wax situated above a section of structured packing in gas enrichment zone 206. The present inventors have found that increase in wax temperature between stages may be less than about 5° C., less than about 2° C. or less than about 1° C. depending on the activity of the catalyst. Accordingly, the need for cooling apparatus inside the reactor tank, for example cooling tubes, may be reduced or eliminated, the heat of reaction being removed via an external heat exchanger of a standard design.

The external heat exchanger may be operated in a manner resulting in very high heat transfer coefficient on the wax side, which in turn allows a significant reduction in the heat exchange surface area. The reactors according to the invention may be used with a range of coolants in the external heat exchanger, including ambient air or a water cooling tower if the heat generated by the reaction is not intended to be utilised for generating steam for electricity production. The temperature difference between the coolant and the wax circulated between the reactor and external heat exchanger can be at least 50° C. or at least 100° C. and may be up to about 180 to 190° C., which may allow about 40 to 50-fold reduction in the heat exchange area as compared to slurry reactors.

Optionally, a pressurised water loop may be used, as in other Fischer-Tropsch reactor designs, except that the heat exchange area is outside the reactor and the pressure in the water loop may be lower as there are no constraints on the coolant temperature relating to reactor operability considerations. In particular, a temperature difference of about 50 deg C. may be employed between the wax and the boiling water, which allows about 10 to 15-fold reduction in the heat exchange area over conventional designs while still being able to generate steam that is suitable for electricity production.

The reactor may be operated at a pressure in the range of about 20 to 35 barG. In the absence of heat-exchange structures inside the reactor tank, only the external tank body 230 needs to withstand the operating pressure.

The highly exothermic nature of the Fischer-Tropsch process can lead to "runaway" temperature increase during the process, particularly if "hot-spots" develop within a reactor. This temperature increase can be dangerous as well as damaging to the catalyst. However, in reactors according to the present invention, the reaction may be stopped simply by closing the gas inlet or inlets to allow the concentration of hydrogen and carbon monoxide in wax to deplete. Additionally or alternatively, the pump may be stopped such that only the gas carried by wax that is already in contact with the catalyst will react. Furthermore, the concentration of hydrogen and carbon monoxide that is absorbed by the wax is typically lower at higher temperatures, and so without any access of the gas phase to the catalyst cartridges the overall rate of reaction will not increase significantly if wax temperature exceeds an optimum operating temperature for a given catalyst.

The process of the invention may provide for controlled and cost effective formation of hydrocarbons. The rate of reaction, and heat generated per unit time, may be controlled by a number of factors including, without limitation, one or more of gas pressure applied by a gas compressor (not shown); flow-rate delivered by pump 204; the temperature set point in the controller of an external heat exchanger; the quantity of catalyst in each cartridge; cartridge thickness; the number of cartridges per reaction zone; and the total number of reaction zones.

The process of the invention does not require that catalyst be dispersed in the wax. By using a carrier that is substantially free of catalyst, the risk of catalyst clogging within the reaction vessel is reduced or eliminated.

In order to replace or reactivate catalyst, spent cartridges may be removed and reactivated, or replaced with new cartridges, without necessarily having to drain any or all wax from the reactor sump 234. Containment of catalyst within cartridges reduces or eliminates the presence of catalytic particles within the hydrocarbon product removed from the reactor, and provides for a straightforward process for catalyst replenishment.

Figure 3:
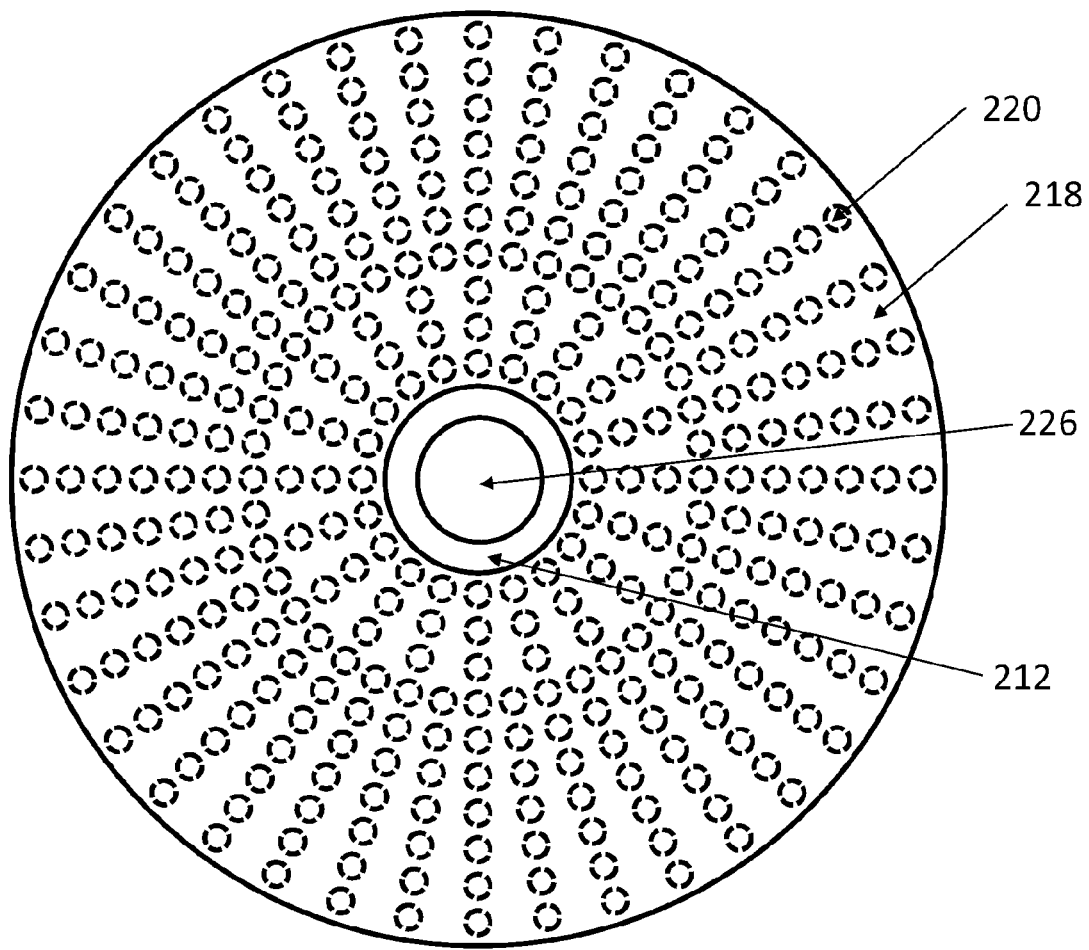
FIG. 3 illustrates a plan view of a reaction zone plate of the reactor of FIG. 2.

Components of one or more reaction zones and/or gas enrichment zones may be removable from the reactor for maintenance and/or replacement of the one or more stages, or for transportation of the reactor. FIG. 3 illustrates a plan view of a removable plate 218 for use in a reaction zone of a reactor according to an embodiment of the invention. The plate 218 is in the form of an annular disc of any suitable metal or metal alloy, for example steel, having a plurality of apertures 220 in which catalyst cartridges may be retained. FIG. 3 illustrates an annular plate 218, however it will be appreciated that the plate 218 may have any shape that can be contained within the reaction vessel. A seal may be provided around the edge of the plate to prevent leakage of liquid at the plate edge.

The section of structured packing 214 may similarly be of the same dimension as an annular disk.

Figure 4A:
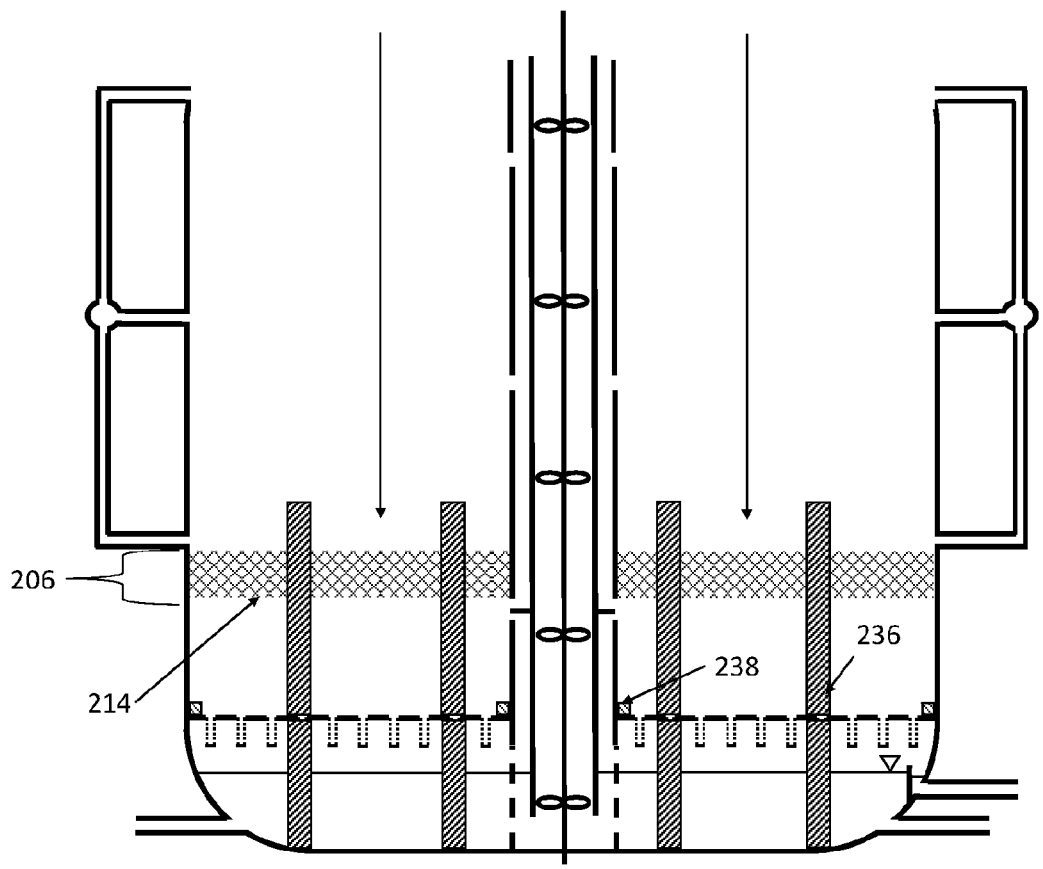
FIG. 4A illustrates insertion of a gas enrichment zone disc of the reactor of FIG. 2.
Figure 4B:
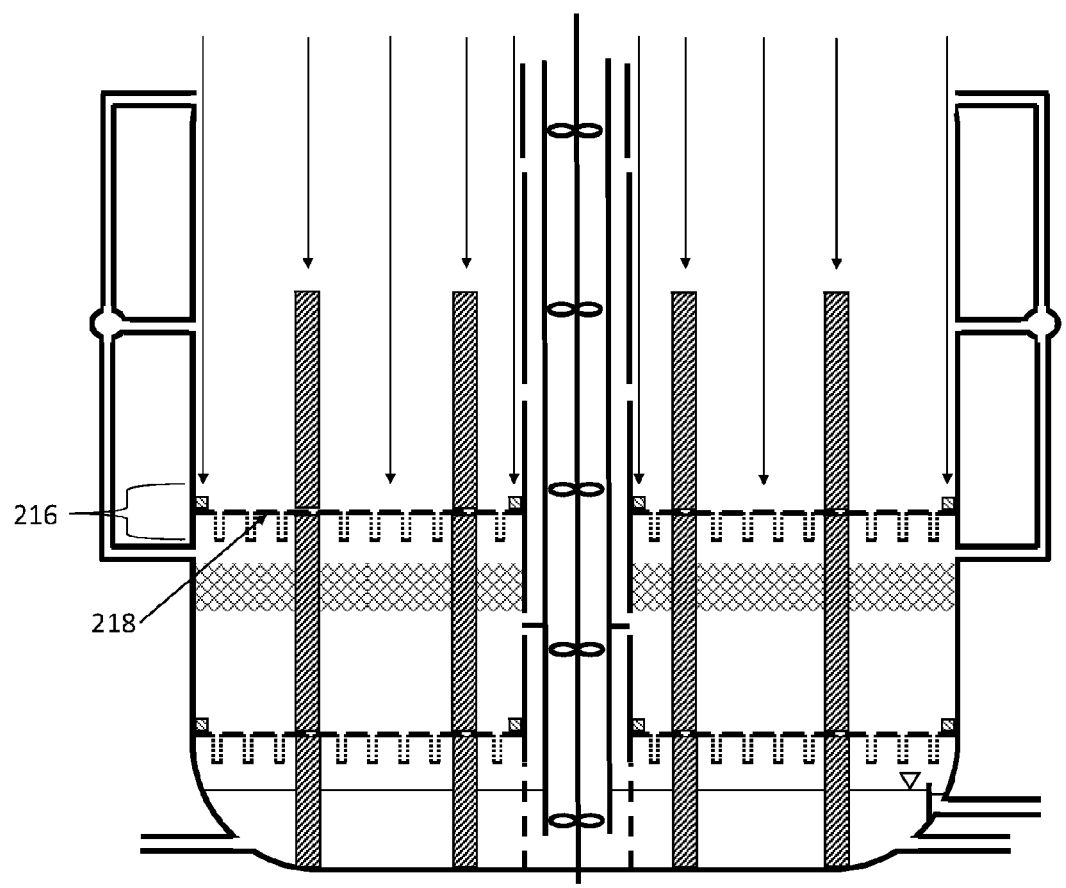
FIG. 4B illustrates insertion of a reaction zone disc of the reactor of FIG. 2.

FIGS. 4A and 4B illustrate a method of constructing a reactor by inserting an annular section of structured packing 214 around wax and gas channels 212 and 226 and into a gas enrichment zone 206 (FIG. 4A) and inserting a plate 218 into a reaction zone 216 (FIG. 4B). Further plates and/or sections of structured packing may be inserted as required. In this way, the reactor may be assembled or disassembled in a modular fashion.

One or more pillars 236 may extend from a base along part of or all of the height of the reactor to provide support to one or more plates and or one or more sections of structured packing. The base may be a base of the reactor or another base suitable for supporting the pillars. One or more seals 238 may be provided for the or each plate 218.

Reactors according to the invention may readily be scaled up or scaled down. The reactors may have low weight in terms of reactor weight per unit catalyst productivity as compared to slurry or fixed bed reactors. Reactors according to the invention may be dismantled and/or assembled as described in FIGS. 4A and 4B. These factors, alone or in combination, may allow for transportation of the reactors to sites where the feedstock used to form syngas is located instead of construction of a dedicated, immovable reactor at that site.

Cartridges

Figure 5A:
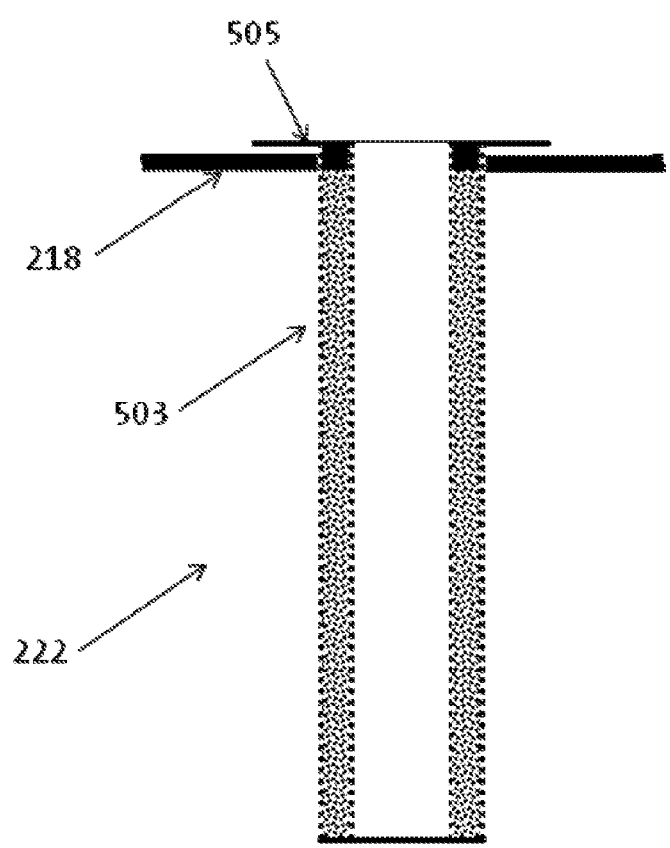
FIG. 5A illustrates a catalyst cartridge according to an embodiment of the invention.

FIG. 5A illustrates a cartridge 222 according to an embodiment of the invention. The cartridge is formed of a porous material 503 encasing catalyst particles that form a porous bed therein. The cartridge of the embodiment of FIG. 5A is of a tubular shape, however it will be appreciated that the cartridge may have any shape.

The cartridge may be supported by plate 218 such that the porous material of the cartridge is disposed above, in line with or below the aperture. FIG. 5A shows a cartridge having a cartridge cap 505 wherein the cartridge cap is wider than the aperture 228 such that the cartridge may be retained in the aperture. Any other retaining means may be used to retain the cartridge 222 in the aperture 228.

Figure 2A:
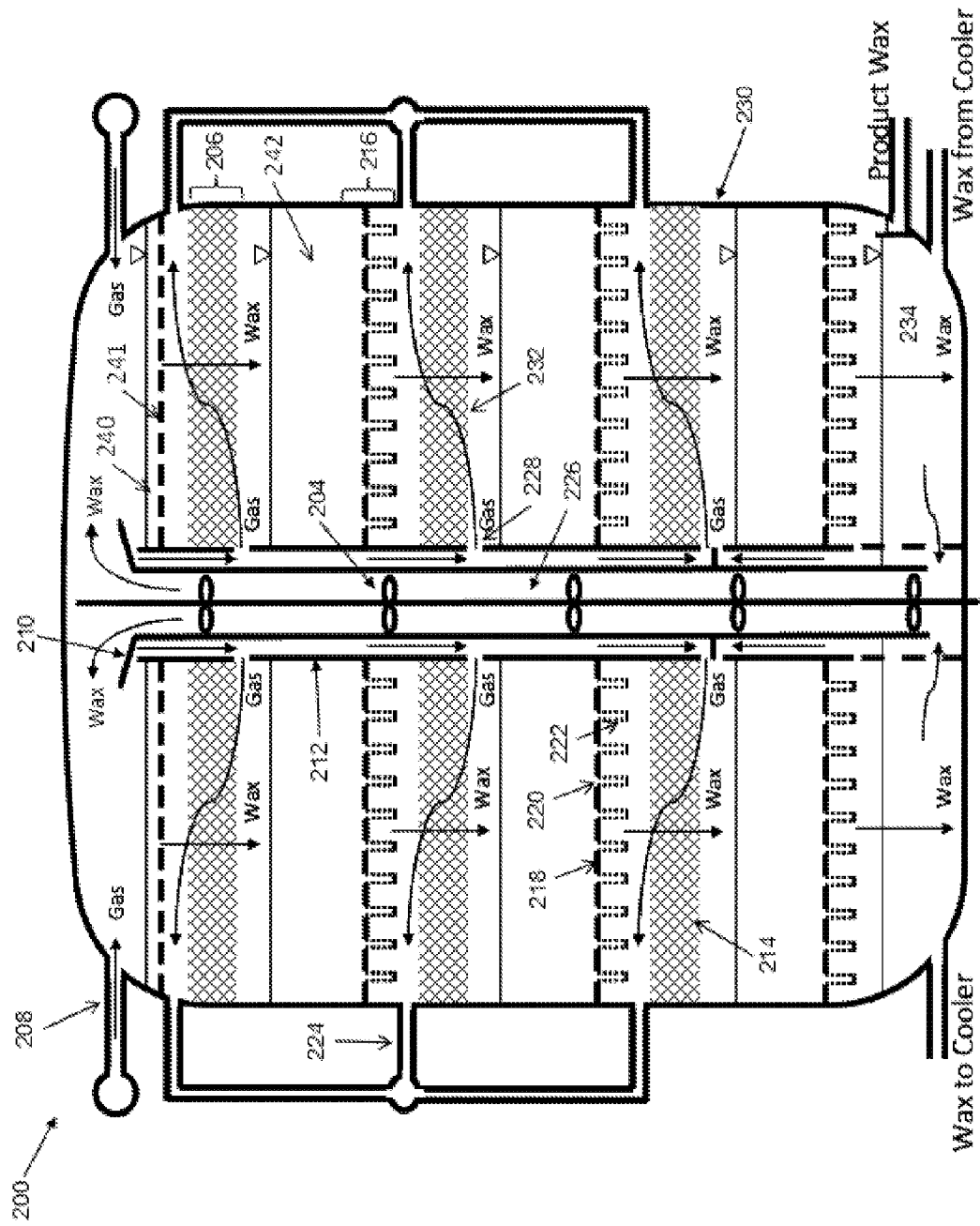
FIG. 2A illustrates a cross-section of a Fischer-Tropsch reactor according to an embodiment of the invention wherein catalyst is retained at a position below a level of a substrate.
Figure 5B:
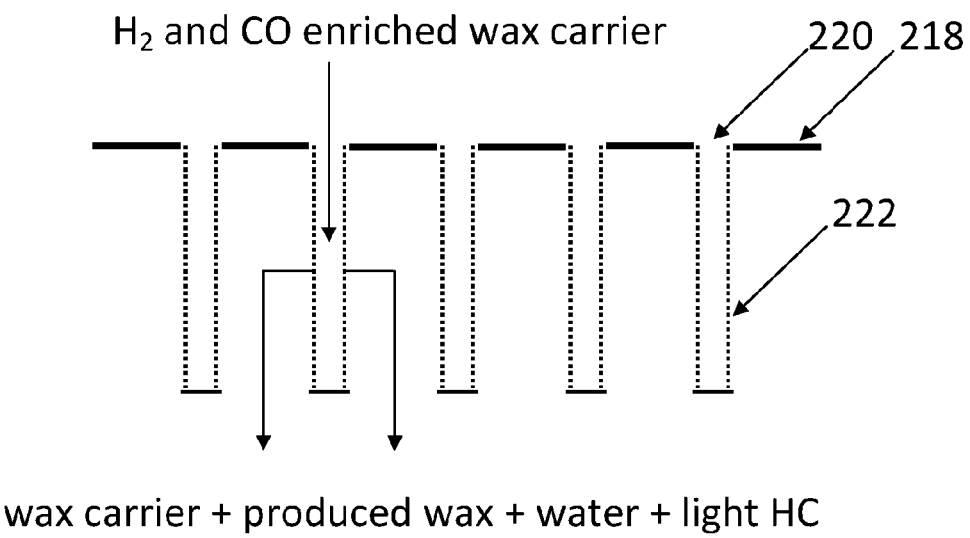
FIG. 5B illustrates a first arrangement of a catalyst cartridge on a substrate.

FIG. 5B illustrates a plate 218 carrying cartridges 222 retained below apertures 220 of the plate. Use of this configuration in a reactor is illustrated in FIG. 2A.

Figure 2B:
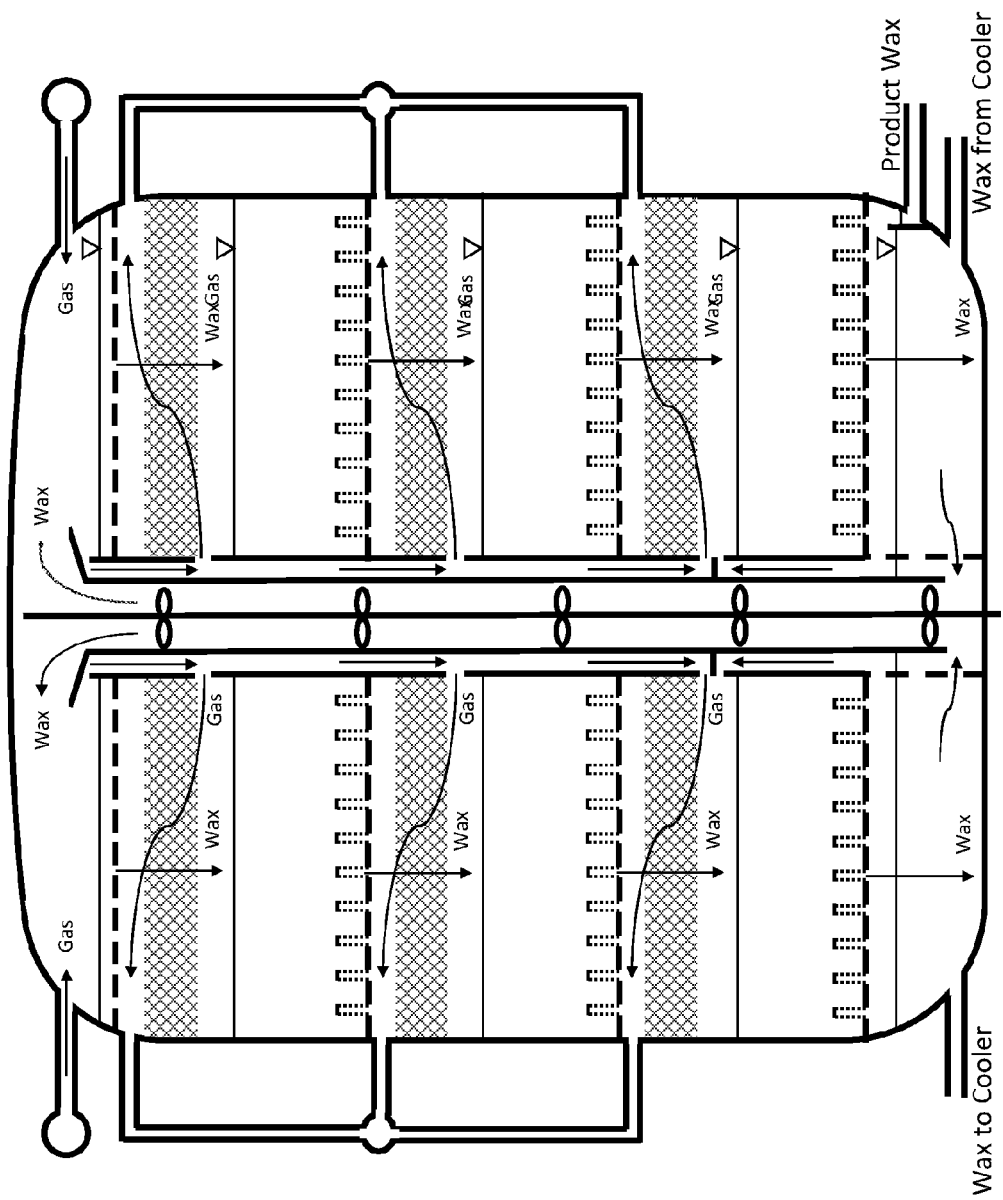
FIG. 2B illustrates a cross-section of a Fischer-Tropsch reactor according to an embodiment of the invention wherein catalyst is retained at a position above a level of a substrate.
Figure 5C:
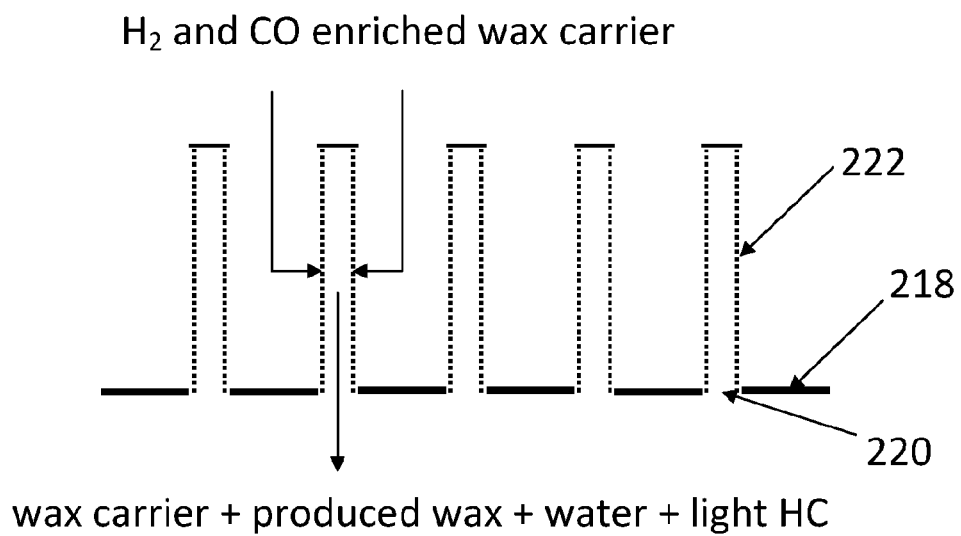
FIG. 5C illustrates a second arrangement of a catalyst cartridge on a substrate.

FIG. 5C illustrates a plate 218 carrying cartridges 222 retained above apertures 220 of the plate. Use of this configuration in a reactor is illustrated in FIG. 2B.

The cartridge may be formed from any suitable material that is porous to the liquid wax, for example stainless steel mesh; fiberglass fabric such as is used in high temperature solid-liquid filtration; or ceramic materials that can embed catalyst particles and harden forming a highly porous wall of the cartridge.

The cartridge may provide a thickness of about at least 1 mm or at least 5 mm for the wax to pass through, optionally a thickness of up to about 20 mm.

Exemplary catalysts may include any known catalyst for Fischer-Tropsch reactions such as cobalt or iron-based catalysts.

In one embodiment, a cartridge may be formed by rolling a strip of porous fabric or metal mesh while dispensing a powder of catalyst particles onto the strip to form a coil having catalyst disposed between layers of the coil.

In another embodiment, the cartridge is an annulus between two metal meshes that is partially or completely filled with a powder of catalyst particles.

The catalyst particles may have a particle diameter of up to about 100 microns, optionally between about 50 and 100 microns. In other embodiments, the catalyst may be in the form of pellets having at least one dimension exceeding 100 microns.

It will be appreciated that catalyst is provided in the reactor of the invention without any need for the high pressure steel tubes used to contain catalyst in prior art fixed bed reactors.

Hydrocarbons produced by the reaction may include hydrocarbons having 1-100 carbon atoms, and may include linear or branched alkanes or alkenes. Depending on the desired hydrocarbon product distribution profile, selectivity to methane may be maintained below about 5%.

Example 1: Deployment of the Invention within Gas-to-Liquid Plants

Figure 6:
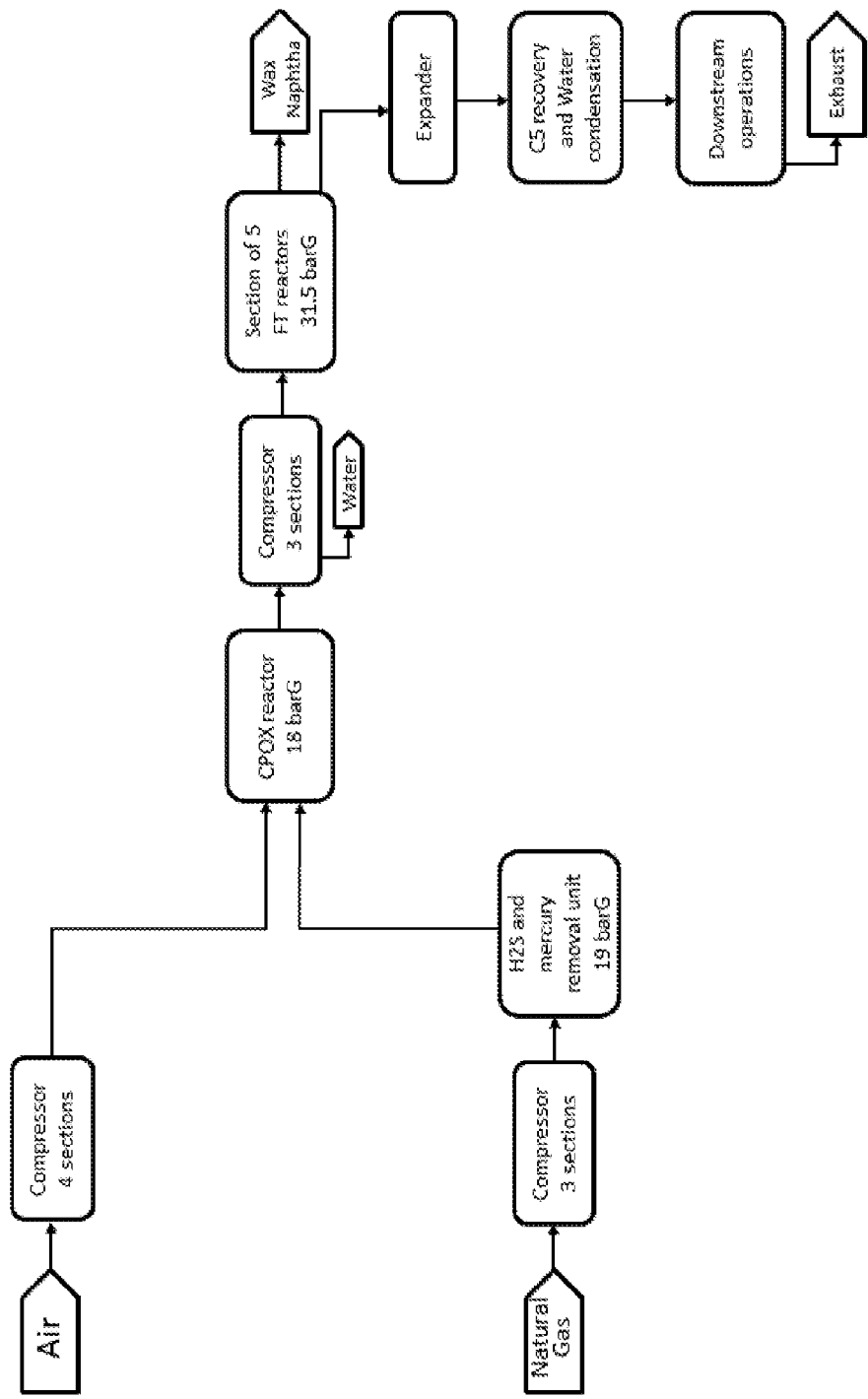
FIG. 6 illustrates a gas-to-liquid plant containing a reactor according to an embodiment of the invention.

FIG. 6 illustrates a gas-to-liquid (GTL) plant containing a reactor according to the invention. The GTL plant of FIG. 6 has a natural gas feedstock, however the skilled person will understand that reactors of the invention may be used with any feedstock for carbon monoxide and hydrogen, including gas from coal gasification and/or reformed natural gas.

The GTL plant contains a natural gas source and, as the reactor of the invention is designed to process low-quality syngas, an air source instead of oxygen that would have to be provided by the oxygen plant. The natural gas is fed into a purification unit for removal of hydrogen sulphide, before being fed with the air into a catalytic partial oxidation (CPOX) reactor in which the syngas is formed. The syngas is fed into one or more reactors according to the invention to form hydrocarbon product. Gaseous hydrocarbon product is fed into a gas expander, and low-boiling point products contained in the gaseous product, such as $C_5$ hydrocarbons, may be recovered. Remaining gases may be expelled after oxidation in an afterburner or processed in an optional downstream operation.

The advanced modelling software gPROMS® from Process Systems Enterprise Ltd. was used as a platform for developing detailed mathematical models of a catalytic partial oxidation (CPOX) reactor and a Fischer-Tropsch (FT) reactor according to an embodiment of the invention. The surface chemistry kinetics model for the CPOX reactor is based on Reference [3]. The FT reactor chemistry kinetics is a product of compiling the information from References [4], [5] and [6] while adjusting the main kinetics constants in a manner such that, if deployed in a standard, large-scale slurry reactor, the catalyst would result in a yield of 0.3 kg wax/kg cat./h.

A Fischer-Tropsch process using the reactor of the type illustrated in FIG. 2 was simulated using an advanced model of the mass and heat transfer in the structured packing that accounts for finite rates of multicomponent mass/heat transfer; pressure driven convection; and heterogeneous reaction phenomena within the cartridge.

Syngas having the composition shown in Table 1 was fed into the section of 5 FT reactors operated in parallel, with 4 gas enrichment and reaction zones in each, at a rate of 9305 kg/hour×5=46527 kg/hour.

TABLE 1

| Syngas composition | | |
| --- | --- | --- |
| Constituent | Mol fraction | Mass fraction |
| $H_2$ | 0.363 | 0.039 |
| CO | 0.167 | 0.247 |
| $CO_2$ | 0.027 | 0.063 |
| $N_2$ | 0.436 | 0.645 |
| $CH_4$ | 0.006 | 0.005 |
| $H_2O$ | 0.001 | 0.001 |

The reactor operating pressure was 31.5 barG. The external heat exchangers were operated to return to each reactor wax cooled down to a temperature of 493 K.

Each of the 5 FT reactors is charged with 1423 kg of a cobalt-based catalyst in the form of about 50-100 micron particles and of activity equivalent to a standard catalyst used in slurry reactors. The total catalyst inventory is 5×1423=7115 kg.

The total number of catalyst cartridges in the 5 FT reactors is 1210×4×5=24,200.

The approximate dimensions of each of the 5 FT reactors are 5.5 m in height and 2.5 m in diameter.

The total height of structured packing in the 5 FT reactors is 0.65 m×4×5=13 m.

The predicted values of the key performance indicators resulting from the above set-up are as follows:

Catalyst productivity: 0.55 kg hydrocarbon product per kilogram of catalyst per hour.

Hydrogen conversion: 89.6%

CO conversion: 90.0%

Wax and naphtha: 725.4 kg/hour×5=3,627 kg/hour (588 bbl/day)

Wax and naphtha including C5 hydrocarbon recovered from outgas: 787.0 kg/hour×5=3,935 kg/hour (630 bbl/day)

Figure 7:
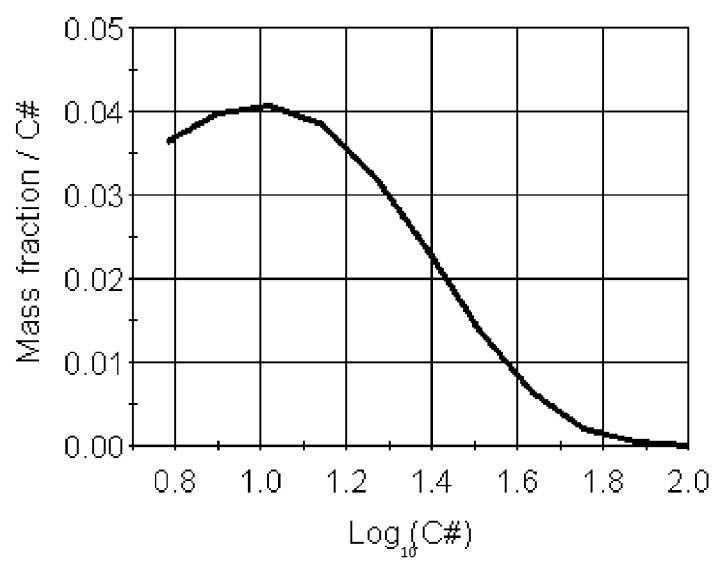
FIG. 7 illustrates a distribution of carbon chain length in the wax product.

FIG. 7 illustrates a distribution of carbon chain length in the wax product.

Water and light hydrocarbons dissolved in the wax product: 8.2 kg/hour×5=41 kg/hour.

Molar selectivity to methane: 5.9%

Outgas: 8562.8 kg/hour×5=42,814 kg/hour

The outgas composition is shown in Table 2.

TABLE 2

| Outgas composition | |
| --- | --- |
| Constituent | Mass fraction |
| $H_2$ | 0.0043 |
| CO | 0.027 |
| $CO_2$ | 0.071 |
| $N_2$ | 0.700 |
| $CH_4$ | 0.013 |
| $C_2H_6$ | 0.0079 |
| $C_3H_8$ | 0.0080 |
| $C_4H_{10}$ | 0.0073 |

TABLE 2-continued

| Outgas composition | |
| --- | --- |
| Constituent | Mass fraction |
| $C_5H_{12}$ | 0.0061 |
| $H_2O$ | 0.154 |

Wax temperature before/after the external heat exchanger: 500 K/493K

Cooling duty: 3.5 MW×5=17.5 MW

Power requirement for wax circulation pumps 204: 11.0 kW×5=55 kW

Pressure drop between the syngas inlet and outlet: 50 mbar

Wax temperature before/after reaction zone 1: 492.7K/494.7K

Wax temperature before/after reaction zone 2: 494.4K/496.5K

Wax temperature before/after reaction zone 3: 496.2K/498.3K

Wax temperature before/after reaction zone 4: 498.0K/500.1K

An arrangement of FT reactors into two stages in series, with water vapour condensed from the intermediate gas stream can also be considered. This would allow reduction in catalyst oxidation.

Example 2: Deployment of the Invention within Gas-to-Liquid Plants

Example 2 considers lean syngas having the composition shown in Table 3. This was fed into 5 FT reactors operated in parallel, with 4 gas enrichment and reaction zones in each, at a rate of 10755 kg/hour×5=53775 kg/hour.

TABLE 3

| Syngas composition | | |
| --- | --- | --- |
| Constituent | Mol fraction | Mass fraction |
| $H_2$ | 0.300 | 0.029 |
| CO | 0.147 | 0.197 |
| $CO_2$ | 0.083 | 0.173 |
| $N_2$ | 0.415 | 0.556 |
| $CH_4$ | 0.020 | 0.016 |
| $H_2O$ | 0.034 | 0.029 |

The reactor operating pressure was 31.5 barG. The external heat exchangers were operated to return to each reactor wax cooled down to a temperature of 493 K.

Each of the 5 FT reactors is charged with 2370 kg of a cobalt-based catalyst in the form of particles of about 50-100 micron diameter and of activity equivalent to a standard catalyst used in slurry reactors. The total catalyst inventory is 5×2370=11,850 kg.

The total number of catalyst cartridges in the 5 FT reactors is 2015×4×5=40,300.

The approximate dimensions of each of the 5 FT reactors are 5.5 m in height and 2.4 m in diameter.

The total height of structured packing in the 5 FT reactors is 0.6 m×4×5=12 m.

The predicted values of the key performance indicators resulting from the above set-up are as follows:

Catalyst productivity: 0.32 kg hydrocarbon product per kilogram of catalyst per hour.

Hydrogen conversion: 93.2%

CO conversion: 89.6%

Wax and naphtha: 705.6 kg/hour×5=3,528 kg/hour (565 bbl/day)

Wax and naphtha including C5 hydrocarbon recovered from outgas: 752.6 kg/hour×5=3,763 kg/hour (602 bbl/day)

Water and light hydrocarbons dissolved in the wax product: 8.6 kg/hour×5=43 kg/hour.

Molar selectivity to methane: 4.7%

Outgas: 10,040.8 kg/hour×5=50,204 kg/hour

The outgas composition is shown in Table 4.

TABLE 4

Outgas composition

| Constituent | Mass fraction |
|---|---|
| $H_2$ | 0.0021 |
| CO | 0.022 |
| $CO_2$ | 0.189 |
| $N_2$ | 0.569 |
| $CH_4$ | 0.022 |
| $C_2H_6$ | 0.0051 |
| $C_3H_8$ | 0.0054 |
| $C_4H_{10}$ | 0.0052 |
| $C_5H_{12}$ | 0.0047 |
| $H_2O$ | 0.150 |

Wax temperature before/after the external heat exchanger: 499 K/493K

Cooling duty: 3.1 MW×5=15.5 MW

Power requirement for wax circulation pumps 204: 11.8 kW×5=59 kW

Pressure drop between the syngas inlet and outlet: 50 mbar

Wax temperature before/after reaction zone 1: 492.7K/494.5K

Wax temperature before/after reaction zone 2: 494.2K/496.0K

Wax temperature before/after reaction zone 3: 495.7K/497.5K

Wax temperature before/after reaction zone 4: 497.2K/499.0K

REFERENCES

1. Davis, B. H., (2002), Overview of reactors for liquid phase Fischer-Tropsch synthesis. *Catalysis Today*, 71, 249-300.
2. Euzen, J-P., Harter, I., Chaumette, P. (1999), Conversion of Synthesis Gas to Hydrocarbons in the Presence of a Liquid Phase, U.S. Pat. No. 5,869,541.
3. Schwiedernoch, R., Tischer, S., Correa, Ch., Deutschmann, O., (2003). Experimental and numerical study on the transient behavior of partial oxidation of methane in catalytic monolith. *Chemical Engineering Science*, 58, 633-642.
4. Anderson, R. B., (1956). Catalysts for the Fischer-Tropsch synthesis. In: Emmett, PH, editor. *Catalysis*, New York: Van Nostrand-Reinhold, 1956.
5. Sarup, B., Wojciechowski, B W., (1989). Studies of the Fischer-Tropsch synthesis on a cobalt catalyst. II. Kinetics of carbon monoxide conversion to methane and to higher hydrocarbons. *Can J Chem Eng*, 67, 62-74.
6. Yates, I. C., Satterfield, C. N., (1991). Intrinsic Kinetics of the Fischer-Tropsch Synthesis on a Cobalt Catalyst. *Energy & Fuels*, 5, 168-173.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A method of forming a hydrocarbon product, the method comprising:
   a first step in a first gas enrichment zone of a reactor of enriching a carrier liquid by absorption of carbon monoxide and hydrogen using a flow of gas containing carbon monoxide and hydrogen; and
   a subsequent step of bringing the enriched carrier liquid into contact with a catalyst in a separate first reaction zone of the reactor;
   wherein the catalyst catalyses reaction of the carbon monoxide and hydrogen to form the hydrocarbon product; and
   wherein the gas enrichment zone is arranged to enrich the carrier liquid such that all hydrogen and carbon monoxide reaching the catalyst comprises hydrogen and carbon monoxide absorbed in the enriched carrier liquid rather than comprising free gas such that the reaction is a two-phase reaction between the enriched carrier liquid and the catalyst in the first reaction zone;
   the method including the step of:
   flowing the gas containing carbon monoxide and hydrogen into the gas enrichment zone to intersect a direction of flow of the carrier liquid through the gas enrichment zone in order to enrich the carrier liquid by absorption of carbon monoxide and hydrogen.

2. A method according to claim 1 wherein the carrier liquid is brought into contact with a catalyst in one or more further reaction zones of the reactor after passing through the first reaction zone.

3. A method according to claim 2 wherein the carrier liquid is enriched with carbon monoxide and hydrogen supplied to one or more further gas enrichment zones of the reactor after the carrier liquid passes through the first reaction zone and before the carrier liquid passes through the one or more further reaction zones.

4. A method according to claim 1 wherein the carrier liquid passes through the reactor under the influence of gravity.

5. A method according to claim 4, wherein the gas containing carbon monoxide and hydrogen passes through the gas enrichment zone in a direction opposite to the direction of flow of the carrier liquid.

6. A method according to claim 1 wherein the gas enrichment zone comprises packing material, optionally structured, that the carrier liquid and the gas containing hydrogen and carbon monoxide pass through to provide the enriched carrier liquid.

7. A method according to claim 1 wherein the catalyst in the reaction zone is supported by a substrate and wherein one or more cartridges comprising the catalyst are retained in one or more respective apertures in the substrate, the cartridge being porous to the carrier liquid.

8. A method according to claim 3 wherein a gas is passed through the carrier liquid in the one or more further gas enrichment zones of the reactor, to desorb from the carrier liquid and absorb into the gas, a water by-product formed by reaction of the carbon monoxide and hydrogen to thereby remove the water by-product from the reactor prior to the carrier liquid reaching the catalyst in the one or more further reaction zones of the reactor.

9. A method according to claim 1 wherein the carrier liquid is free of catalyst.

10. A method according to claim 1 wherein the carrier liquid is wax produced in the reactor.

11. A method according to claim 1, wherein the gas enrichment zone contains a packing material that the gas containing carbon monoxide and hydrogen and the carrier liquid pass through; the method including the steps of:
   flowing the carrier liquid downwardly through the packing material; and
   flowing the gas containing carbon monoxide and hydrogen into the packing material to intersect the downward flow of the carrier liquid.

12. A method according to claim 11 wherein the gas containing carbon monoxide and hydrogen is arranged to flow into the packing material to intersect the downward flow of the carrier liquid such that any carbon monoxide or hydrogen not absorbed by the carrier liquid exits above the packing material.

13. A method according to claim 1 including providing a plurality of gas enrichment zones and flowing gas containing hydrogen and carbon monoxide to each of the gas enrichment zones in parallel.

14. A method according to claim 7 including providing the catalyst in the cartridges in the form of catalyst particles having a size in the range of about 50 to 100 microns.

* * * * *